(12) United States Patent
Perez

(10) Patent No.: US 7,665,523 B2
(45) Date of Patent: Feb. 23, 2010

(54) COMPOSITIONS AND METHODS FOR TREATMENT OF WELL BORE TAR

(75) Inventor: Gregory P. Perez, Pearland, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 156 days.

(21) Appl. No.: 11/873,257

(22) Filed: Oct. 16, 2007

(65) Prior Publication Data

US 2009/0095534 A1 Apr. 16, 2009

(51) Int. Cl.
    *E21B 37/06* (2006.01)
    *E21B 43/25* (2006.01)
    *E21B 47/00* (2006.01)
    *C09K 8/035* (2006.01)
    *C09K 8/524* (2006.01)

(52) U.S. Cl. ............... 166/300; 166/250.01; 166/305.1; 166/312; 175/40; 175/65; 134/22.19; 208/390; 507/90; 507/118; 507/125; 507/224; 507/231

(58) Field of Classification Search ............... 175/65; 166/304, 305.1, 312, 250.01; 507/125, 231, 507/930, 90

See application file for complete search history.

(56) References Cited

U.S. PATENT DOCUMENTS

| | | | |
|---|---|---|---|
| 3,960,214 A | 6/1976 | Striegler et al. | |
| 5,866,517 A * | 2/1999 | Carpenter et al. | 507/226 |
| 6,104,224 A | 8/2000 | Koshikawa | 327/277 |
| 6,564,869 B2 | 5/2003 | McKenzie et al. | 166/304 |
| 7,081,438 B2 | 7/2006 | Horton | 507/128 |

(Continued)

FOREIGN PATENT DOCUMENTS

CA    2451585    6/2004

(Continued)

OTHER PUBLICATIONS

Thomson Scientific, London, GB; 1985-043467, XP002512517.

(Continued)

*Primary Examiner*—Jennifer H Gay
*Assistant Examiner*—Catherine Loikith
(74) *Attorney, Agent, or Firm*—Craig W. Roddy; Tumey, LLP

(57) ABSTRACT

Of the many compositions and methods provided herein, one method includes a method comprising: contacting tar resident in a well bore with a treatment fluid comprising a styrene-acrylate polymer; and allowing the styrene-acrylate polymer to interact with the tar to at least partially reduce the tendency of the tar to adhere to a surface. Another method provided herein includes a method for treating tar sand comprising: contacting the tar sand with a treatment fluid comprising an aqueous fluid and a styrene-acrylate polymer, the tar sand comprising tar and sand; and allowing the styrene-acrylate polymers to interact with the tar to at least partially separate the tar from the sand.

20 Claims, 5 Drawing Sheets

U.S. PATENT DOCUMENTS

| | | | |
|---|---|---|---|
| 7,278,485 B2 | 10/2007 | Kirsner et al. | 166/305.1 |
| 7,332,458 B2 * | 2/2008 | Baltoiu et al. | 507/110 |
| 2004/0204324 A1 | 10/2004 | Baltoiu et al. | 507/100 |
| 2005/0037927 A1 | 2/2005 | Horton | 507/100 |
| 2006/0144594 A1 * | 7/2006 | Perez | 166/300 |
| 2006/0148656 A1 | 7/2006 | Perez | 507/140 |
| 2007/0114036 A1 | 5/2007 | Perez | 166/300 |

FOREIGN PATENT DOCUMENTS

| | | |
|---|---|---|
| CA | 2481543 | 3/2006 |
| WO | 2004/050790 A1 | 6/2004 |
| WO | 2004/050791 A1 | 6/2004 |
| WO | 2007041841 A1 | 4/2007 |

OTHER PUBLICATIONS

Thomson Scientific, London, GB, 1989-229547, XP002512518.

International Search Report and Written Opinion for PCT/GB2008/003405, dated Feb. 5, 2009.

Warren, et al., "Development and Field Results of a Unique Drilling Fluid Designed for Heavy Oil Sands Drilling," Society of Petroleum Engineers, SPE 92462, 1-9, Feb. 23-25, 2005.

Freeman, et al., "Novel Drilling Fluid Eliminates Tar Problems Associated With Drilling SAGD Wells," Society of Petroleum Engineers, SPE 90986, 1-5, Sep. 26-29, 2004.

* cited by examiner

US 7,665,523 B2

COMPOSITIONS AND METHODS FOR TREATMENT OF WELL BORE TAR

BACKGROUND

The present invention relates to methods and compositions for use in subterranean operations. More particularly, the present invention relates to styrene-acrylate polymers used to treat tar resident in a well bore and associated methods of use.

Many subterranean operations involve the drilling of a well bore from the surface through rock and/or soil to penetrate a subterranean formation containing fluids that are desirable for production. In the course of drilling operations and other subterranean operations, the drillstring and/or other equipment may come into contact with zones of rock and/or soil containing tar (e.g., heavy hydrocarbons, asphalt, bitumens); in many such operations, it may be desirable to drill the well bore through these tar-containing zones. However, tar is a relatively tacky substance that may readily adhere to any surface that it contacts, including the surfaces of the well bore and/or any equipment utilized during the drilling operation. Tar also may dissolve into many synthetic treatment fluids used in the course of drilling operations, increasing the tacky and adhesive properties of the tar. If a sufficient amount of tar adheres to surfaces in the well bore or drilling equipment, it may, among other problems, prevent the drillstring from rotating, prevent fluid circulation, or otherwise impede the effectiveness of a drilling operation. In some cases, it may become necessary to remove and/or disassemble the drillstring in order to remove accretions of tar, a process which may create numerous cost and safety concerns. The accretion of tar on drilling equipment and/or in the well bore also can impede any subsequent operations downhole, including cementing, acidizing, fracturing, sand control, and remedial treatments. In addition, soft, tacky tar that manages to reach the surface may foul surface equipment, including solids screening equipment.

Existing methods of managing these problems that result from well bore tar incursion may be problematic. Some of these methods involve effecting an increase in hydrostatic pressure in the well bore so as to force the tar out of the well bore to the surface. However, this increased hydrostatic pressure may damage the well bore and/or a portion of the subterranean formation. Other conventional methods utilize treatment fluids that comprise dispersants, surfactants, and/or solubilizers, which allow the tar particles to dissolve in or homogenize with the treatment fluids. However, the tar particles may not be readily separated out of the fluid once they have dissolved into or homogenized with the fluid. The presence of the tar particles in the treatment fluid may alter its rheological properties and/or suspension capacity, which may limit its use in subsequent operations. Moreover, the addition of these dispersants, surfactants, and solubilizers may increase the complexity and cost of the drilling operation.

SUMMARY

The present invention relates to methods and compositions for use in subterranean operations. More particularly, the present invention relates to styrene-acrylate polymers used to treat tar resident in a well bore and associated methods of use.

In one embodiment, the present invention provides a method comprising contacting tar resident in a well bore with a treatment fluid comprising a styrene-acrylate polymer, and allowing the styrene-acrylate polymer to interact with the tar to at least partially reduce the tendency of the tar to adhere to a surface.

In one embodiment, the present invention provides a method of treating tar sand comprising contacting the tar sand with a treatment fluid comprising an aqueous fluid and a styrene-acrylate polymer, the tar sand comprising tar and sand, and allowing the styrene-acrylate polymers to interact with the tar to at least partially separate the tar from the sand.

In one embodiment, the present invention provides a method comprising using a drill bit to enlarge a well bore in a subterranean formation comprising tar, and circulating an aqueous-based fluid past the drill bit to remove cuttings therefrom, the aqueous-based fluid comprising an aqueous fluid and a styrene-acrylate polymer, wherein the styrene-acrylate polymer interacts with at least a portion of the tar in the subterranean formation to at least partially reduce the tendency of the tar to adhere to a surface.

In one embodiment, the present invention provides a treatment fluid comprising an aqueous-based fluid that comprises an aqueous fluid and a styrene-acrylate polymer.

In one embodiment, the present invention provides a drilling fluid comprising an aqueous-based fluid that comprises an aqueous fluid, a styrene-acrylate polymer, and a weighting agent.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

Figure 1:
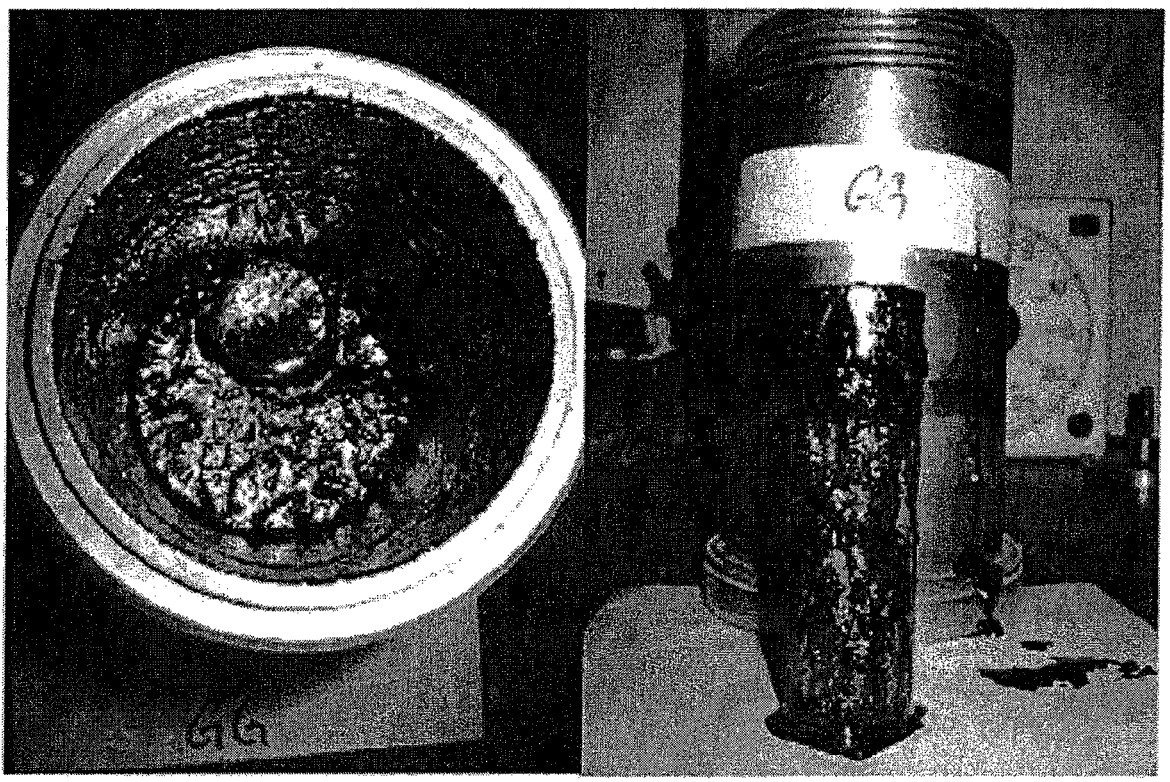
FIG. 1 is a photograph showing the accretion of tar to a test rod in an aqueous base fluid.
Figure 2:
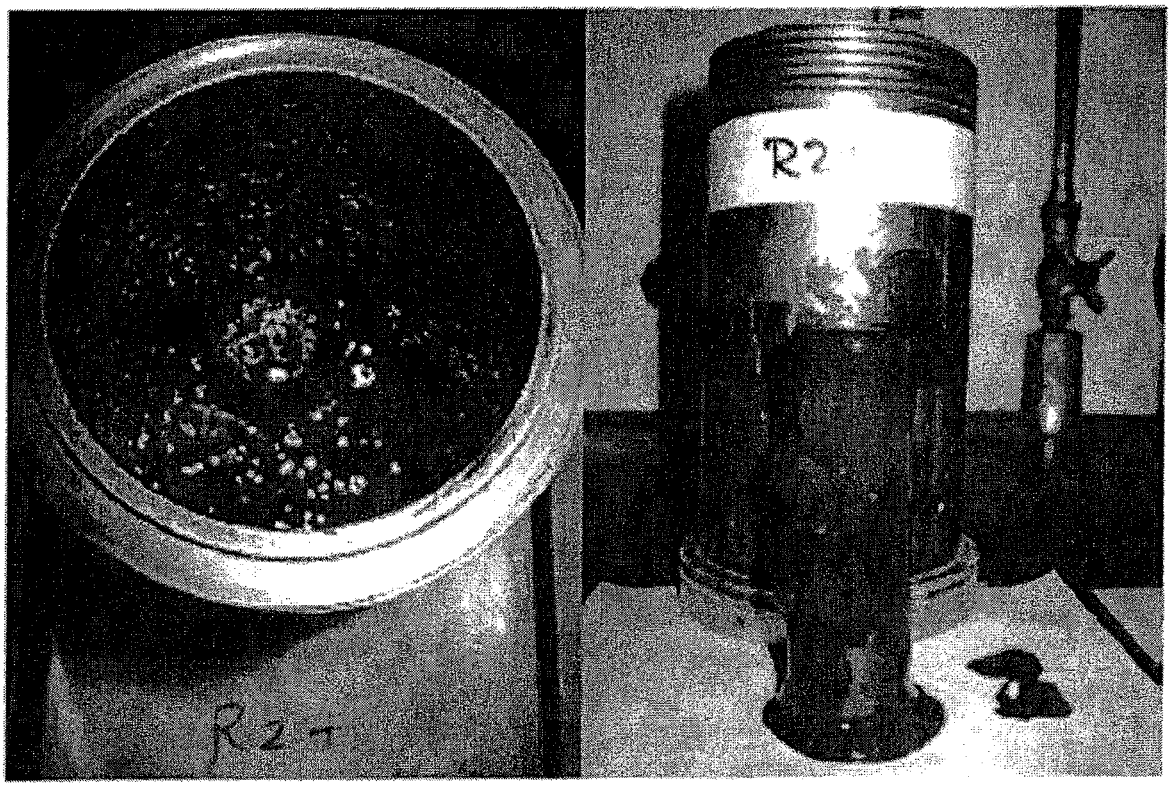
FIG. 2 is a photograph showing the accretion of tar to a test rod in a nonaqueous base fluid.
Figure 3:
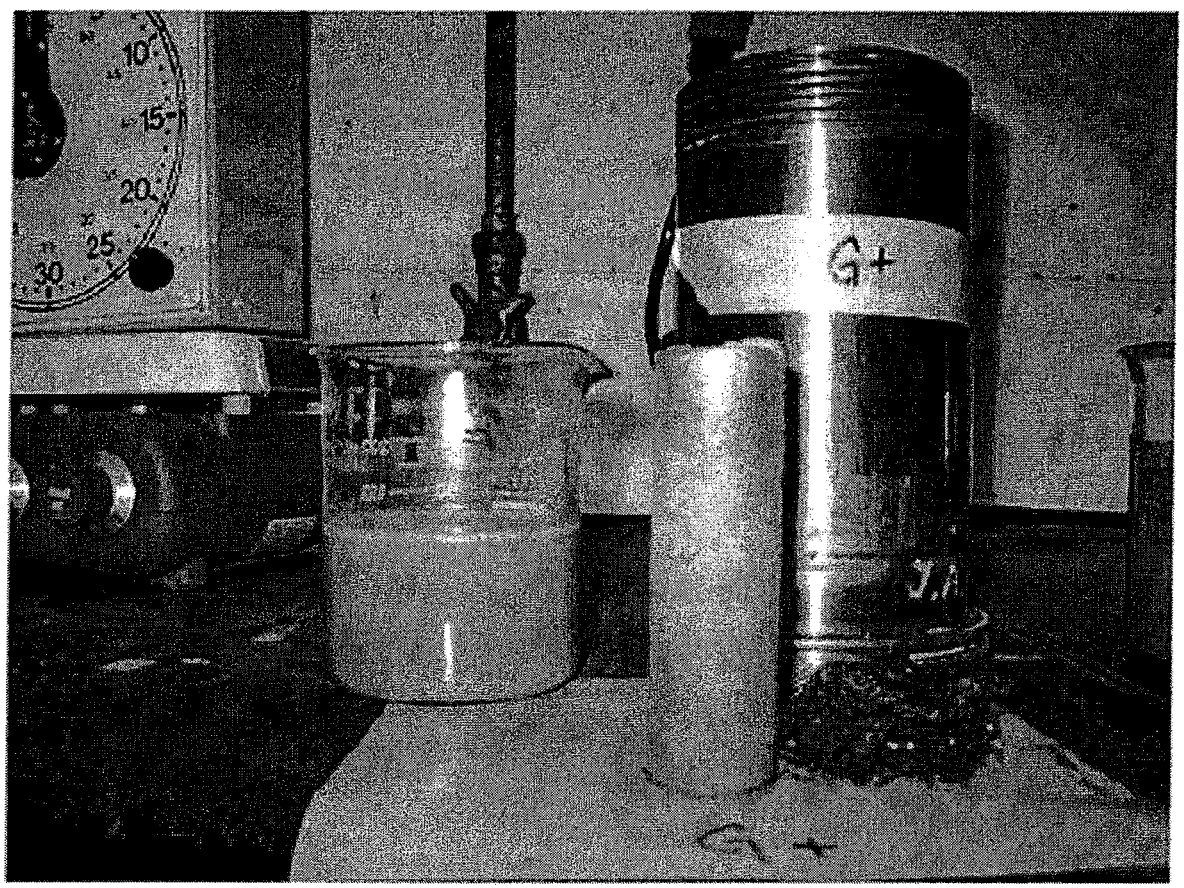
FIG. 3 is a photograph showing the accretion of tar to a test rod in an aqueous treatment fluid of the present invention.
Figure 4:
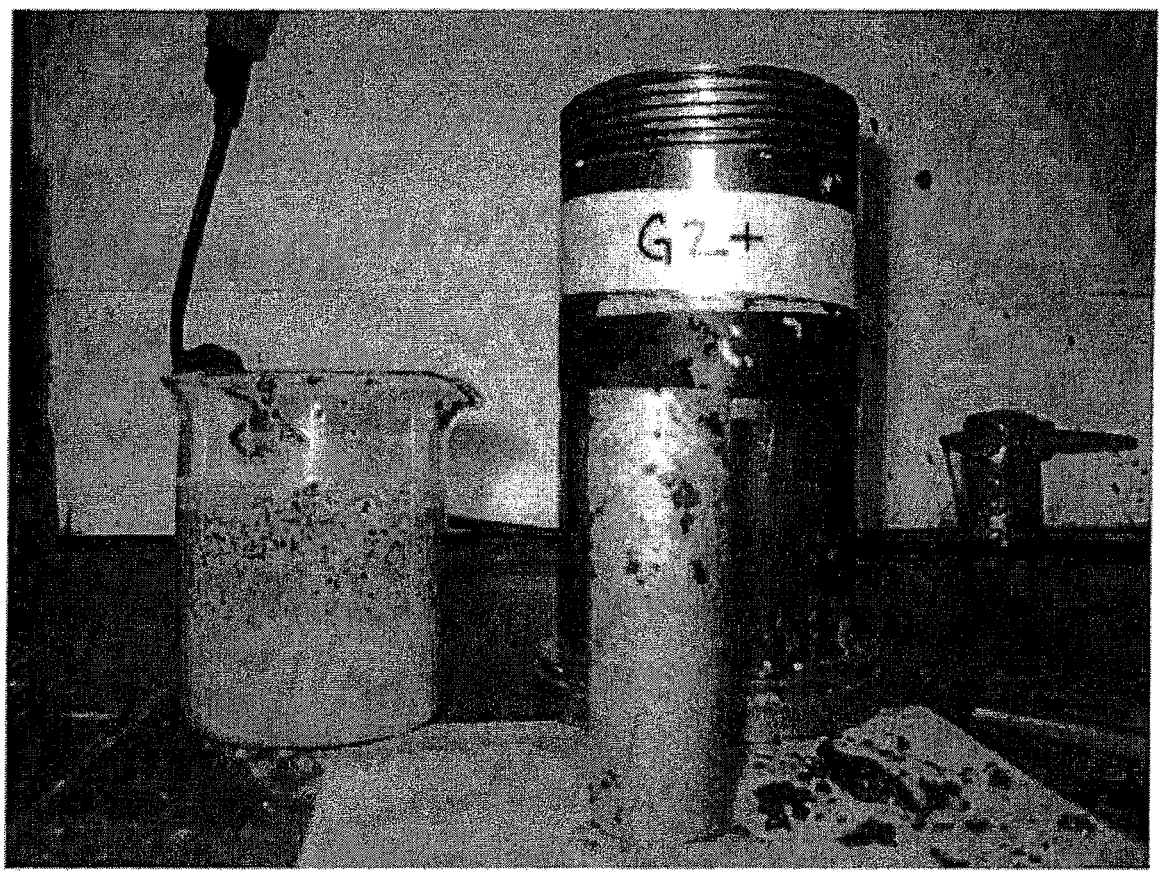
FIG. 4 is a photograph showing the accretion of tar to a test rod in an aqueous treatment fluid of the present invention.
Figure 5:
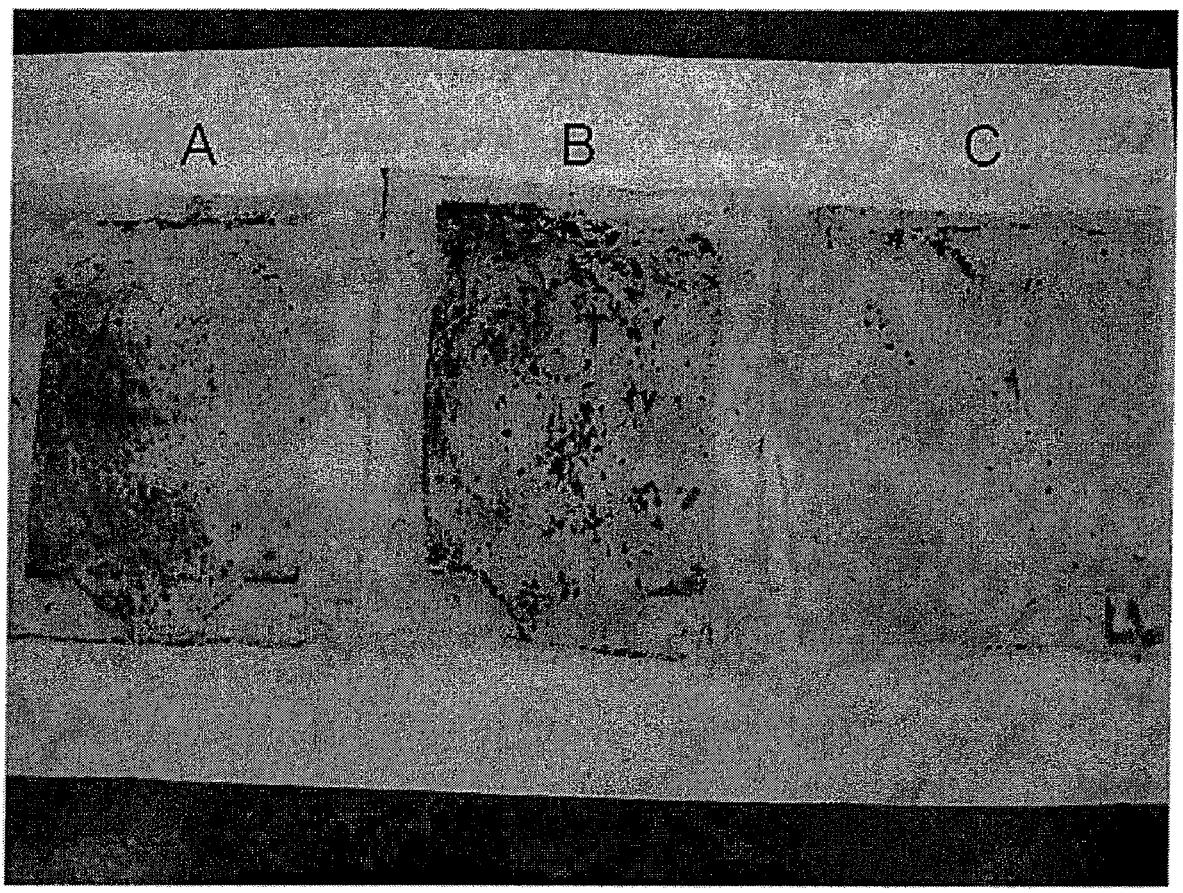
FIG. 5 is a photograph showing tar samples, some of which were treated according to methods of the present invention

The present invention relates to methods and compositions for use in subterranean operations. More particularly, the present invention relates to styrene-acrylate polymers used to treat tar resident in a well bore and associated methods of use.

Tar-treating compositions and methods are provided. One of the many advantages of the present invention, many of which are not discussed or alluded to herein, is that tar treated by the compositions and methods disclosed herein may be substantially less tacky and/or less able to adhere to a surface. As a result, tar treated in this manner may be susceptible to screen separation from treatment fluids, drill cuttings, tar sands, and the like.

The treatment fluids of the present invention generally comprise an aqueous fluid and a styrene-acrylate polymer. As used herein, the term "treatment fluid" refers to any fluid that may be used in a subterranean application in conjunction with a desired function and/or for a desired purpose. The term "treatment fluid" does not imply any particular action by the fluid or any component thereof. Generally, any styrene-acrylate polymer that can be emulsified in an aqueous fluid may be used. The polymeric material may be ionic or nonionic in nature. In certain embodiments, the styrene-acrylate polymers may interact with the tar resident in a well bore such that the properties of the tar are altered. In certain embodiments, the polymer may bind or coat the tar such that the tar becomes less sticky. Thus, the polymer (or polymers when more than one styrene-acrylate polymer is used) should be added to the well bore in a quantity sufficient to treat the tar therein, in accordance with embodiments of the present invention.

In certain embodiments, the concentration of the styrene-acrylate polymer in the treatment fluid may be at least about 1% by volume of the fluid, and up to an amount such that the styrene-acrylate polymers will precipitate out of the fluid. In certain embodiments, the concentration of styrene-acrylate polymer in the treatment fluid may be in the range of from about 1% to about 70% by volume of the fluid. In certain embodiments, the concentration of styrene-acrylate polymer in the treatment fluid may be in the range for from about 1% to about 10% by volume of the fluid. In certain embodiments, the styrene-acrylate polymer may be added to a treatment fluid, or introduced directly into the well bore, as latex-type emulsions or as dispersed particles. One of ordinary skill in the art, with the benefit of this disclosure, will be able to determine the appropriate concentration of the styrene-acrylate polymer in the fluid for a particular application.

Examples of styrene-acrylate polymers that may be suitable for use in the treatment fluids of the present invention may include, but are not limited to, styrene-acrylate copolymers and mixed copolymers which include at least one of styrene, a substituted styrene, and any derivative thereof; and at least one of -acrylate, -methacrylate, -ethylacrylate, -propylacrylate, -butylacrylate, -tert-butyl-acrylate, -n-hydroxyethyl methacrylate, -potassium acrylate, -pentabromobenzyl acrylate, -methyl methacrylate, -ethyl methacrylate, -n-nitrophenyl acrylate, -methyl 2-(acyloxymethyl)acrylate, -cyclohexyl acrylate, -n-ethylhexyl acrylate, or any derivative thereof. Combinations of suitable styrene-acrylate polymers may also be suitable, in certain embodiments.

The aqueous fluid utilized in the treatment fluids of the present invention may be fresh water, distilled water, or salt water (e.g., water containing one or more salts dissolved therein). In certain embodiments, the treatment fluid may be an aqueous-based fluid. Generally, the water can be from any source, provided that it does not contain compounds that undesirably affect other components of the treatment fluid.

Optionally, some embodiments may include a surfactant to aid the emulsification and/or suspension of the styrene-acrylate polymers. Generally, any surfactant that will emulsify and/or suspend the styrene-acrylate polymers may be used in the fluids of the present invention. In certain embodiments, it may be desirable to select a surfactant that will not emulsify the tar sought to be treated. In certain embodiments, the surfactants may be present in an amount sufficient to emulsify and/or suspend the styrene-acrylate polymers. This amount may depend on, among other things, the type of surfactant used and the amount of polymer to be emulsified and/or suspended. A person of ordinary skill in the art will recognize, with the benefit of this disclosure, the type and amount of surfactant that should be added for a particular application.

In certain embodiments, the treatment fluids of the present invention may also comprise additional components to enhance, among other things, the performance of the styrene-acrylate polymers in specific applications. For example, some embodiments may comprise a viscosifier, among other purposes, to aid in suspending the styrene-acrylate polymers in a treatment fluid, such as a drilling fluid. Suitable viscosifying agents may include, but are not limited to, colloidal agents (e.g., clays such as bentonite, polymers, guar gum), emulsion-forming agents, diatomaceous earth, biopolymers, synthetic polymers, chitosans, starches, gelatins, or mixtures thereof.

The treatment fluids of the present invention optionally may comprise additional additives to enhance the performance of the fluid. The treatment fluids of the present invention may comprise any such additional additives that do not undesirably interact with the styrene-acrylate polymer or other components of the fluid. Generally, additional additives should not emulsify or dissolve the tar sought to be treated. The treatment fluids used in methods of the present invention optionally may comprise any number of additional additives, including, but not limited to, salts, surfactants, additional fluid-loss-control additives, gas, nitrogen, carbon dioxide, surface-modifying agents, tackifying agents, foamers, additional corrosion inhibitors, scale inhibitors, catalysts, clay-control agents, biocides, friction reducers, antifoam agents, bridging agents, dispersants, flocculants, $H_2S$ scavengers, $CO_2$ scavengers, oxygen scavengers, lubricants, viscosifiers, breakers, weighting agents (e.g., barite), relative-permeability modifiers, resins, particulate materials (e.g., proppant particulates), wetting agents, coating-enhancement agents, and the like. Weighting agents may be used, for example, in a drilling fluid to provide a density sufficient to, for example, control formation pressures. In certain embodiments, the drilling fluid may have a density in the range of from about 7.5 pounds per gallon ("lb/gal") to about 18 lb/gal, and alternatively from about 12 lb/gal to about 18 lb/gal. One of ordinary skill in the art, with the benefit of this disclosure, will be able to determine which additional additives are appropriate for a particular application.

Generally, the methods of the present invention comprise allowing a fluid comprising a styrene-acrylate polymer to interact with tar resident in a well bore, which may, among other things, reducing the adhesiveness of the tar to facilitate removal of the tar from a well bore or other surface. When the styrene-acrylate polymer interacts with tar, the styrene may coat or encapsulate the tar such that the tar is less tacky. In applications where it is desirable to drill through tar encountered in the course of drilling a well bore, drilling through tar altered in this way may yield tar-cuttings that can be removed more effectively from the well bore. Additionally, tar that is drilled-through may be less likely to flow into the well bore or the subterranean formation as the plastic properties of the tar may be altered. Similarly, in applications where the styrene-acrylate polymer is added to a drilling fluid, the treated tar that forms about the surface of the well bore may act to stabilize the well bore. In addition, tar treated with the compositions and methods of the present invention may be separated from a treatment fluid by passing the fluid through a screen or similar separation apparatus.

In one embodiment, the present invention provides a method comprising contact tar resident in a well bore with a treatment fluid comprising an aqueous fluid and a styrene-acrylate polymer. In such embodiments, the styrene-acrylate polymer may be provided in various forms, including, but not limited to, an emulsion, a suspension, a powder, and any combination thereof. In certain embodiments, the treatment fluid may be an aqueous-based fluid. Introducing the styrene-acrylate polymer to the vicinity of a desired portion of the well bore may be accomplished by a variety of methods known by a person of ordinary skill in the art with the benefit of this disclosure. One example of such a method comprises pumping water into the well bore, wherein the styrene-acrylate polymer is carried into the well bore on the leading edge of the water (e.g., a plug). In other embodiments of the present invention, the polymer may be pumped into the well bore while suspended in a treatment fluid (e.g., a drilling fluid).

In certain embodiments, the styrene-acrylate polymer may be provided as a "spot treatment" or "pill," wherein the polymer is pumped into the well bore to interact with tar in a specific portion of the well bore. In certain embodiments of this type, the styrene-acrylate polymer may be allowed to interact with the tar resident in the well bore for at least a time sufficient to at least partially reduce the adhesiveness of the tar. In some circumstances, this may be more than about one hour. In others, more time will be required to at least partially reduce the adhesiveness of the tar, depending upon, among other factors, the temperature inside the well bore and the amount of tar in the portion of the well bore being treated. One of ordinary skill in the art, with the benefit of this disclosure, will be able to determine the appropriate amount of time to allow the styrene-acrylate polymer to interact with the tar. In certain embodiments, after the styrene-acrylate polymer has been allowed to interact with the tar, the tar then may be removed from the well bore by any means practicable for the given application.

In some applications, embodiments of the present invention may be used in conjunction with nonaqueous treatment fluids. Embodiments such as a spot treatment or pill may be especially suited for use in conjunction with nonaqueous-based treatment fluids. Where the treatment fluid is nonaqueous based, the treatment fluid may comprise any number of organic liquids. Examples of suitable organic liquids include, but are not limited to, mineral oils, synthetic oils, esters, paraffin oils, diesel oil, and the like.

In another embodiment, the present invention provides a method comprising contact tar resident in a well bore with a treatment fluid comprising an aqueous fluid and a styrene-acrylate polymer into a well bore and allowing the styrene-acrylate polymer to interact with tar resident in the well bore to at least partially reduce the tendency of the tar to adhere to a surface. In certain embodiments of this type, the styrene-acrylate polymer may be allowed to interact with the tar as long as the treatment fluid is present in the well bore. One of ordinary skill in the art, with the benefit of this disclosure, will be able to determine the appropriate amount of time to allow the styrene-acrylate polymer to interact with the tar so as to at least partially reduce the adhesiveness of the tar. In certain embodiments, after the styrene-acrylate polymer has been allowed to interact with the tar, the tar then may be removed from the well bore by any means practicable for the given application.

In another embodiment, the present invention provides a method comprising: placing a treatment fluid comprising an aqueous fluid and a styrene-acrylate polymer into a well bore; and monitoring the amount of the styrene-acrylate polymer present in the treatment fluid. For example, once a unit of styrene-acrylate polymer in a treatment fluid is allowed to interact with a unit of tar in a well bore, that unit of styrene-acrylate polymer may be depleted from the treatment fluid and thus unable to interact with additional tar. For this reason, it may be desirable to monitor the concentration of the styrene-acrylate polymer in the treatment fluid to determine if more should be added. In some embodiments, the styrene-acrylate polymer may be introduced into the treatment fluid before the treatment fluid is introduced into the well bore, for example, a batch-mixing process. In some embodiments, it may be desirable to continue to add the styrene-acrylate polymer to the treatment fluid (e.g., "on-the-fly" mixing) according to the monitored concentration of the styrene-acrylate polymer in the treatment fluid. In some embodiments, the concentration of styrene-acrylate polymer in the treatment fluid may be monitored by direct measurement. In some embodiments, the concentration of styrene-acrylate polymer in the treatment fluid may be monitored indirectly by measuring the depletion of the styrene-acrylate polymer from the treatment fluid. The concentration of the styrene-acrylate polymer in the treatment fluid may be monitored, for example, by analytical polymer spectroscopy, chromatography, gravimetry, and quantitative precipitation.

Another embodiment provides a method of treating tar sands to separate the tar from the sand comprising: contacting the tar sand with a treatment fluid comprising an aqueous fluid and a styrene-acrylate polymer, the tar sand comprising tar and sand; and allowing the styrene-acrylate polymer to interact with the tar to at least partially separate the tar from the sand. The term "tar sand" does not require or imply that any specific amount of tar be present.

Another embodiment provides a method of drilling a well bore comprising: using a drill bit to enlarge a well bore; and circulating a drilling fluid past the drill bit to remove cuttings therefrom, the drilling fluid comprising an aqueous fluid and a styrene-acrylate polymer. In certain embodiments, tar may be present within the well bore, and the styrene-acrylate polymer may be allowed to interact with the tar to at least partially reduce the adhesiveness of the tar. In certain embodiments, after the styrene-acrylate polymer has been allowed to interact with the tar, the tar then may be removed from the well bore by any means practicable for the given application.

To facilitate a better understanding of the present invention, the following examples of specific embodiments are given. In no way should the following examples be read to limit or define the entire scope of the invention.

EXAMPLE 1

Certain embodiments of the present invention were tested in an aqueous-base fluid formulated as shown in Table 1.

TABLE 1

| Base Fluid 1 | |
|---|---|
| Fresh Water (lb/bbl) | 345.8 |
| Xanthan Gum (lb/bbl) | 0.701 |
| Starch (lb/bbl) | 4.206 |
| Cellulose (lb/bbl) | 0.701 |
| Caustic Soda (lb/bbl) | 0.05 |

A nonaqueous-base fluid was also formulated as shown in Table 2.

TABLE 2

| Base Fluid 2 | |
|---|---|
| Synthetic Base Oil (lb/bbl) | 131.45 |
| Fatty Acid Emulsifier (lb/bbl) | 10 |
| Freshwater (lb/bbl) | 84.12 |
| Lime (lb/bbl) | 1 |
| Polymeric Filtration Agent (lb/bbl) | 2 |
| Barium Sulfate (lb/bbl) | 188.96 |
| Calcium Carbonate (lb/bbl) | 15 |
| Calcium Chloride (lb/bbl) | 29.09 |
| Simulated Drill Solids (lb/bbl) | 20 |
| Rheology Modifier (lb/bbl) | 1 |

A 50 g sample of tar sand (25% tar by mass) was placed in a first ½ lab barrel along with 133.1 g of Base Fluid 1 and a steel test rod. A 12.5 g sample of tar was placed in a second ½ lab barrel along with 216.9 g of Base Fluid 2 and a steel test rod. The barrels were then hot rolled for 16 hours at 150° F.

under 200 psi in a rolling cell, and the test rods were visually inspected for tar accretion. Base Fluid 1 was contaminated with tar sand and tar was accreted on the test rod. Base Fluid 2 was contaminated with tar and tar was accreted on the test rod.

EXAMPLE 2

The two fluid samples were prepared as set forth in Table 3 using the Base Fluid 1 described in Table 1. The styrene-acrylate polymers used in this example were obtained as an emulsion and used as received. Baracor™ corrosion inhibitor is an anti-corrosion additive commercially available from Halliburton Energy Services, Houston, Texas. After hot rolling for 16 hours at 150° F. under 200 psi in a rolling cell, the mass of the test rod was determined both with any accreted tar and after the accreted tar had been cleaned off. These masses and the mass of the accreted tar for each sample is reported in Table 3.

TABLE 3

| | Sample | |
|---|---|---|
| | 3 | 4 |
| Base Fluid 1(g) | 133.1 | 150.6 |
| Styrene-Acrylate Emulsion(g) | 15 | 15 |
| Baracor 700 ™ Corrosion Inhibitor (ml) | 0.75 | 0.75 |
| Tar Sand (g) | 50 | — |
| Tar (g) | — | 12.5 |
| Post Accretion Test Rod Mass (g) | 337.45 | 337.16 |
| Post Cleaning Test Rod Mass (g) | 337.25 | 336.93 |
| Mass of accreted tar (g) | 0.20 | 0.23 |
| Observations | Tar not sticking to cell wall. Rod is clean. Tar is firm, not sticky. Sand is separated from tar and settled on bottom of cell. Fluid not contaminated. | Tar form small flocs. Tar not on cell wall. Rod has loosely adhered flocs that can be easily brushed away. Tar is pliable but not sticky. |

EXAMPLE 3

In this example, tar was screened from tar-containing fluids. Base fluid 1 was combined with tar sand and, in two cases, a treatment additive, as illustrated in Table 4 below. The tar-containing fluids were hot rolled then poured across a vibrating screen material to assess potential screen clogging properties. A screen may be considered fouled if the tar is adhesive and begins to seal/clog the screen openings thereby preventing a fluid from effectively draining. Sample A was a baseline reference of nontreated, adhesive tar and yielded adhesive screen fouling. Sample B was an unsuccessful treatment with a sodium salt that also yielded adhesive screen fouling. Sample C was a chemical treatment of tar with styrene-acrylate polymers that yielded a non-adhesive tar and minimized screen fouling. The styrene-acrylate polymers used in this example (C) were the same as in the previous tests.

TABLE 4

| | Sample | | |
|---|---|---|---|
| | A | B | C |
| Base Fluid 1(g) | 149.8 | 149.8 | 149.8 |
| Sodium Salt (g) | — | 26.25 | — |
| Styrene acrylate emulsion (g) | — | — | 15 |
| Baracor 700 ™ Corrosion Inhibitor (ml) | — | — | 0.75 |
| Tar Sand (g) | 50 | 50 | 50 |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Moreover, the indefinite articles "a" or "an", as used in the claims, are defined herein to mean one or more than one of the element that it introduces. Also, the terms in the claims have their plain, ordinary meaning unless otherwise explicitly and clearly defined by the patentee.

What is claimed is:

1. A method comprising:
    contacting tar resident in a well bore with a treatment fluid comprising a styrene-acrylate copolymer; and
    allowing the styrene-acrylate copolymer to interact with the tar to at least partially reduce the tendency of the tar to adhere to a surface.

2. The method of claim 1 wherein the styrene-acrylate copolymer is introduced into the treatment fluid after the treatment fluid contacts the tar in the well bore.

3. The method of claim 1 further comprising monitoring the amount of the styrene-acrylate copolymer present in the treatment fluid.

4. The method of claim 1 wherein the treatment fluid is placed in the well bore to react with tar present at a specific location therein.

5. The method of claim 1 wherein the treatment fluid is placed into the well bore during drilling of the well bore.

6. The method of claim 1 wherein the treatment fluid is an aqueous-based fluid comprising an aqueous fluid and the styrene-acrylate copolymer.

7. The method of claim 1 wherein the styrene-acrylate copolymer comprises:
at least one unit selected from the group consisting of a styrene, a substituted styrene, and any derivative thereof; and
at least one unit selected from the group consisting of -acrylate, -methacrylate, -ethylacrylate, -propylacrylate, -butylacrylate, -tert-butyl-acrylate, -n-hydroxyethyl methacrylate, -potassium acrylate, -pentabromobenzyl acrylate, -methyl methacrylate, -ethyl methacrylate, -n-nitrophenyl acrylate, -methyl 2-(acyloxymethyl)acrylate, -cyclohexyl acrylate, -n-ethylhexyl acrylate, and any derivative thereof.

8. The method of claim 1 wherein the treatment fluid further comprises a surfactant.

9. The method of claim 1 wherein the styrene-acrylate copolymer is allowed to interact with the tar for more than about one hour.

10. The method of claim 1 wherein the styrene-acrylate copolymer is present in the treatment fluid in an amount of about 1% to about 10% by volume of the treatment fluid.

11. A method of treating tar sand comprising:
contacting the tar sand with a treatment fluid comprising an aqueous fluid and a styrene-acrylate copolymer, the tar sand comprising tar and sand; and
allowing the styrene-acrylate copolymer to interact with the tar to at least partially separate the tar from the sand.

12. The method of claim 11 wherein the styrene-acrylate copolymer is introduced into the treatment fluid after the treatment fluid contacts the tar sand in at least one of a subterranean formation or a well bore.

13. The method of claim 11 further comprising monitoring the amount of the styrene-acrylate copolymer present in the treatment fluid.

14. The method of claim 11 wherein the treatment fluid is placed in a well bore to react with tar present at a specific location in the well bore.

15. The method of claim 11 wherein the styrene-acrylate copolymer comprises:
at least one unit selected from the group consisting of a styrene, a substituted styrene, and any derivative thereof; and
at least one unit selected from the group consisting of -acrylate, -methacrylate, -ethylacrylate, -propylacrylate, -butylacrylate, -tert-butyl-acrylate, -n-hydroxyethyl methacrylate, -potassium acrylate, -pentabromobenzyl acrylate, -methyl methacrylate, -ethyl methacrylate, -n-nitrophenyl acrylate, -methyl 2-(acyloxymethyl)acrylate, -cyclohexyl acrylate, -n-ethylhexyl acrylate, and any derivative thereof.

16. The method of claim 11 wherein the treatment fluid further comprises a surfactant.

17. A method comprising:
using a drill bit to enlarge a well bore in a subterranean formation comprising tar; and
circulating an aqueous-based fluid past the drill bit to remove cuttings therefrom, the aqueous-based fluid comprising an aqueous fluid and a styrene-acrylate copolymer, wherein the styrene-acrylate copolymer interacts with at least a portion of the tar in the subterranean formation to at least partially reduce the tendency of the tar to adhere to a surface.

18. The method of claim 17 wherein the styrene-acrylate copolymer is introduced into the aqueous-based fluid after the aqueous-based fluid contacts the tar in the well bore.

19. The method of claim 17 further comprising monitoring the amount of the styrene-acrylate copolymer in the aqueous-based fluid.

20. The method of claim 17 wherein the styrene-acrylate copolymer comprises:
at least one unit selected from the group consisting of a styrene, a substituted styrene, and any derivative thereof; and
at least one unit selected from the group consisting of -acrylate, -methacrylate, -ethylacrylate, -propylacrylate, -butylacrylate, -tert-butyl-acrylate, -n-hydroxyethyl methacrylate, -potassium acrylate, -pentabromobenzyl acrylate, -methyl methacrylate, -ethyl methacrylate, -n-nitrophenyl acrylate, -methyl 2-(acyloxymethyl)acrylate, -cyclohexyl acrylate, -n-ethylhexyl acrylate, and any derivative thereof.

* * * * *